US010082623B2

(12) United States Patent
Kato et al.

(10) Patent No.: US 10,082,623 B2
(45) Date of Patent: Sep. 25, 2018

(54) RIB TYPE OPTICAL WAVEGUIDE AND OPTICAL MULTIPLEXER / DEMULTIPLEXER USING SAME

(71) Applicant: NEC Corporation, Minato-ku, Tokyo (JP)

(72) Inventors: Tomoaki Kato, Tokyo (JP); Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/514,563

(22) PCT Filed: Sep. 15, 2015

(86) PCT No.: PCT/JP2015/004689
§ 371 (c)(1),
(2) Date: Mar. 27, 2017

(87) PCT Pub. No.: WO2016/051698
PCT Pub. Date: Apr. 7, 2016

(65) Prior Publication Data
US 2017/0227712 A1    Aug. 10, 2017

(30) Foreign Application Priority Data
Oct. 2, 2014    (JP) .................................. 2014-204120

(51) Int. Cl.
*G02B 6/12*    (2006.01)
*G02B 6/125*    (2006.01)
(Continued)

(52) U.S. Cl.
CPC ......... *G02B 6/12007* (2013.01); *G02B 6/125* (2013.01); *G02B 6/1228* (2013.01); *H04B 10/40* (2013.01); *G02B 2006/12164* (2013.01)

(58) Field of Classification Search
CPC .............................. G02B 6/2813; G02B 6/125
See application file for complete search history.

(56) References Cited

U.S. PATENT DOCUMENTS 4,087,159 A    5/1978  Ulrich
7,116,880 B1   10/2006 Liu et al.
(Continued)

FOREIGN PATENT DOCUMENTS

CN    204302526 U    4/2015
GB       2438222 A   11/2007
(Continued)

OTHER PUBLICATIONS

International Search Report for PCT Application No. PCT/JP2015/004689, dated Dec. 8, 2015.
(Continued)

*Primary Examiner* — Sung Pak
*Assistant Examiner* — Hoang Tran

(57) ABSTRACT

Provided are a practical rib type optical waveguide in which polarization dependence and wavelength dependence and the like are small and an optical multiplexer/demultiplexer using the same. An optical waveguide type optical multiplexer/demultiplexer of the present invention includes a substrate, M input optical waveguides and N output optical waveguides including a single mode rib type optical waveguide, multi-mode optical interference regions including a rib type optical waveguide, and reversible tapered regions that smoothly connect the input/output optical waveguides to the multi-mode optical interference regions and include M×N rib type optical waveguides, and both side surfaces of the multi-mode optical interference region are respectively formed in a stepped shape.

11 Claims, 10 Drawing Sheets

(51) Int. Cl.
　　　*G02B 6/122*　　　(2006.01)
　　　*H04B 10/40*　　　(2013.01)

(56) References Cited

U.S. PATENT DOCUMENTS

| | | | |
|---|---|---|---|
| 7,184,207 B1* | 2/2007 | Walker | G02B 6/1228 |
| | | | 359/344 |
| 2002/0197012 A1* | 12/2002 | Liu | G02B 6/124 |
| | | | 385/37 |
| 2009/0041407 A1 | 2/2009 | Silfvenius | |
| 2010/0272389 A1 | 10/2010 | Yamatoya et al. | |
| 2011/0170825 A1* | 7/2011 | Spector | G02B 6/1228 |
| | | | 385/43 |

FOREIGN PATENT DOCUMENTS

| | | |
|---|---|---|
| JP | S51-057457 A | 5/1976 |
| JP | H04-247408 A | 9/1992 |
| JP | 2001-183710 A | 7/2001 |
| JP | 2002-514783 A | 5/2002 |
| JP | 2008-543077 A | 11/2008 |
| JP | 2010-256707 A | 11/2010 |

OTHER PUBLICATIONS

English translation of Written opinion for PCT Application No. PCT/JP2015/004689.
Communication dated May 7, 2018 from the European Patent Office in counterpart European application No. 15846939.5.
Halir, R., et al., "High performance multimode interference couplers for coherent communications in silicon", SPIE Photonics North, 2011, vol. 8007, No. 1, 7 pages.

\* cited by examiner

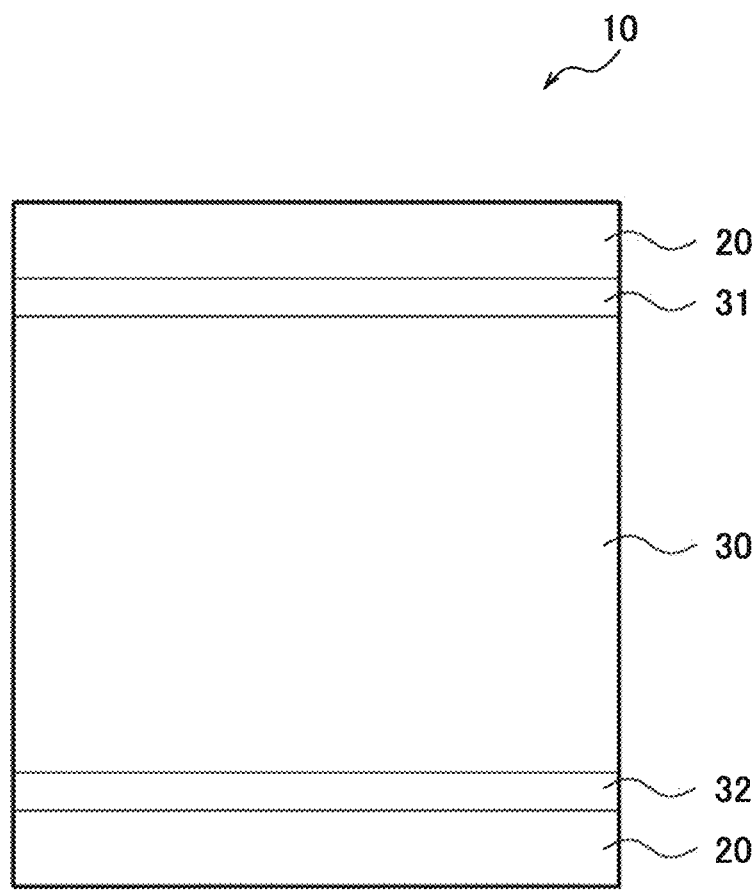

RIB TYPE OPTICAL WAVEGUIDE AND OPTICAL MULTIPLEXER / DEMULTIPLEXER USING SAME

This application is a National Stage Entry of PCT/JP2015/004689 filed on Sep. 15, 2015, which claims priority from Japanese Patent Application 2014-204120 filed on Oct. 2, 2014, the contents of all of which are incorporated herein by reference, in their entirety.

TECHNICAL FIELD

The present invention relates to a rib type optical waveguide and an optical multiplexer/demultiplexer using the same, and more particularly, to a rib type optical waveguide using a semiconductor-based optical waveguide and an optical multiplexer/demultiplexer using the same.

BACKGROUND ART

With an explosive increase in the demand for a wideband multimedia communication service of the Internet, video distribution and the like, a long distant and highly reliable high density wavelength multiplexing optical fiber communication system has been introduced in a trunk line system or a metro system.

In such a large scale communication network, the reduction of operational cost is important as well as the reduction of capital cost. In order to reduce the operational cost, it is needed to optimize dynamic transmission capacity allocation and path switching corresponding to demands, efficient maintenance, a redundant configuration and the like. That is, it is desired to be able to flexibly reconfigure a communication network, and is also desired to reduce cost of reconfiguration.

In order to flexibly reconfigure the communication network at a low cost, an optical switch node capable of switching the path of light without converting a light signal into an electrical signal can be applied. Since the flexibility of the communication network depends on the degree of freedom of the path switching in the optical switch node, it is desired to provide an optical switch with a large number of ports.

In the optical switch, it is further needed to suppress the loss of signal light passing through the optical switch, wavelength dependence, polarization dependence, crosstalk to a non-connection path, and the like. Furthermore, suppression of power consumption needed for holding and switching of a signal light path, and miniaturization of an optical switch node are also important. These are issues directly related to the expandability of the number of ports of the optical switch, and the reduction in size, low loss, and low power characteristics are needed for the optical switch.

On the other hand, it is needed to suppress the occurrence of a problem related to communication service quality such as interruption of a line during communication, and to provide a stable communication state. Furthermore, a high speed path switching characteristic is also needed in order to prevent a line interruption state due to path switching from being recognized by a user. It is desired that such high speed switching can be performed in a small scale circuit with low power as much as possible.

As such an optical switch, there are an MEMS (Micro Electro Mechanical Systems) matrix optical switch, a liquid crystal matrix optical switch, a waveguide matrix optical switch and the like. The MEMS matrix optical switch is an optical switch that switches an optical path of spatial propagation beams by electrostatically controlling the direction of fine movable mirrors formed on a silicon substrate. The liquid crystal matrix optical switch is an optical switch that controls transmittance of spatial propagation beams by electrically changing the alignment state of liquid crystal molecules. The waveguide matrix optical switch is an optical switch that selects a signal light output path by changing an interference state by using temperature dependence of a refractive index of an optical material constituting a waveguide type optical interferometer.

The MEMS matrix optical switch is advantageous in terms of expandability of the number of input/output ports because insertion loss and signal light crosstalk are small. However, since about milliseconds are needed for a response of the movable mirror, the MEMS matrix optical switch is not suitable for use purposes needing high speed and high frequent path switching such as an uninterrupted optical path switching and optical packet signal switching. Furthermore, in the MEMS matrix optical switch, in the case of creating one input multi-output connection state, it is necessary to adjust a beam divergence angle in response to a distance between signal light output ports by sacrificing optical characteristics.

The liquid crystal matrix optical switch has a response time constant equal to that of the MEMS matrix optical switch. The liquid crystal matrix optical switch has high mechanical reliability because it has no movable part such as MEMS. However, in the liquid crystal matrix optical switch, since optical characteristics of liquid crystal molecules largely depend on temperature, degeneration and deterioration may occur in a high temperature environment. Accordingly, in the liquid crystal matrix optical switch, it is necessary to consider resistance to environment and reliability when it is actually applied to a system.

The waveguide matrix optical switch changes an interference state of a large number of waveguide optical interferometers formed on a substrate by electric field application, current injection, temperature and the like, thereby selecting an optical signal output path. The waveguide matrix optical switch is suitable for miniaturization as compared with the aforementioned two types of optical switch elements. Particularly, a waveguide matrix optical switch using silica is advantageous in terms of low loss because coupling efficiency with a single mode optical fiber is high. Furthermore, the waveguide matrix optical switch using silica has high mass productivity and reliability.

The basis configuration of the waveguide matrix optical switch is an optical gate switch that thermally controls interference conditions of the waveguide optical interferometers by applying temperature dependence (a thermo-optic effect) of a refractive index of an optical waveguide material. A time (about milliseconds) approximately equal to that of the MEMS matrix optical switch is required in order such that heat transfer between a core and a clad/a substrate reaches equilibrium. Accordingly, in the waveguide matrix optical switch, in order to shorten the time needed for reaching heat equilibrium, it is desired to make a volume (a sectional area of an optical waveguide) of a heated area in the optical gate switch as small as possible.

Under such situations, much attention has been attracted on an optical switch element using a semiconductor-based optical waveguide capable of significantly miniaturizing an optical waveguide element. As one of the technologies related to the optical switch element using the semiconductor-based optical waveguide, there is a silicon photonics technology. In the silicon photonics technology, a silicon film (SOI: Silicon On Insulator) formed on an insulating film (a film obtaining by thermally oxidizing a silicon substrate surface) is processed into a stripe shape and allowed to serve as an optical waveguide core. Since a refractive index difference between a core layer (a refractive index: about 3.48 @1550 nm) including the SOI film and a clad layer (a refractive index: about 1.45 @1550 nm) including a dielectric film ($SiO_2$ and the like) is large, signal light is strongly confined into the core layer. Accordingly, when the silicon photonics technology is applied, it is possible to suppress insertion loss within a practical range even in a steep curve equal to or less than a curvature of 100 µm. Furthermore, in the silicon photonics technology, it is possible to expect high precision processing and mass productivity based on an advanced CMOS (Complementary Metal Oxide Semiconductor) process technology, and moreover, it is also possible to expect monolithic integration and the like with a driving circuit.

In the case of implementing an M input N output (hereinafter, M×N: M and N are natural numbers equal to or more than 2) matrix optical switch by using the silicon photonics technology, a M×N waveguide optical switch is arranged on two-dimensional lattice points on a semiconductor substrate and optical waveguide groups for connecting them lengthwise and breadthwise are arranged on the same semiconductor substrate. In this case, the optical waveguide groups mutually intersect on the semiconductor substrate.

Signal light inputted to the matrix optical switch is scattered when passing through an intersection region, so that loss occurs. The degree of the scattering correlates with a ratio of the size of a section of the optical waveguide and the size (a mode diameter) of a basic propagation mode of the signal light. Herein, in an optical waveguide using the silicon photonics technology, in which the refractive index difference between the core layer and the clad layer is high and optical confinement is strong, the influence of the scattering of the signal light in the intersection region appears notably. On the other hand, in an optical waveguide based on silica and the like in which the refractive index difference between the core and the clad is small and optical confinement is weak (a weak guided wave: weakly guiding), since the signal light shows a behavior approximate to a plane wave, it is less scattered when passing through the intersection region.

In this regard, in order to reduce the influence of the scattering of the signal light in the intersection region, it has been proposed that a matrix optical switch using the silicon photonics technology is configured using a rib type optical waveguide formed by thickening a part of a two-dimensional thin slab optical waveguide.

An electromagnetic field of a basic propagation mode of the rib type optical waveguide shows a sectional distribution of being approximately confined at inside (inside a silicon layer) than a refractive index boundary surface between a rib sidewall and the clad layer. Since it is possible to increase an effective sectional area by 1 digit as compared with a silicon wire, it is possible to allow signal light to propagate along the rib without taking into consideration of the refractive index boundary surface between the rib sidewall and the clad layer. In this case, it is possible to reduce the scattering of the signal light in the intersection region of the optical waveguide. A rib type optical waveguide-based optical switch element to which the silicon photonics technology is applied, for example, is disclosed in PTLs 1 and 2 and the like. Furthermore, there has also been reported a development example of a matrix optical switch using a 2 input 2 output (2×2) MMI (Multi-Mode Interference) optical multiplexer/demultiplexer based on the rib type optical waveguide to which the silicon photonics technology is applied. Moreover, a technology related to the optical waveguide is disclosed in PTL 3.

CITATION LIST

Patent Literature

[PTL 1] Japanese Unexamined Patent Application Publication No. 2001-183710
[PTL 2] Japanese National Publication of International Patent Application No. 2002-514783
[PTL 3] Japanese Unexamined Patent Application Publication No. 4-247408

SUMMARY OF INVENTION

Technical Problem

As described above, in designing a matrix optical switch to be applied to a trunk line system where optical fiber communication network systems with wavelength division multiplexing scheme is employed, wavelength independence and polarization independence are required. In a silica-based optical waveguide and a silicon wire, it is general to form a sectional shape of a core layer in a square shape in order to allow an electromagnetic field distribution of the core layer to approximate to an electromagnetic field distribution of a complete round of an optical fiber and to enhance the coupling efficiency of both. In the case of the square core layer, unique values (effective refractive indexes) of respective mode (an $E^x_{11}$ mode and a TE-like mode) parallel to a substrate and a mode (an $E^y_{11}$ mode and a TM-like mode) vertical to the substrate are degenerated. Since respective propagation characteristics are the same and are not distinguished from each other, there is no polarization dependence.

On the other hand, in the case of the rib type optical waveguide in which the scattering in the intersection region of the optical waveguide is small, the cross section shape of the waveguide core is asymmetric. The propagation characteristics of the respective $E^x_{11}$ mode and the $E^y_{11}$ mode are generally different from each other and represent polarization dependence. The polarization dependence can be cancelled at a specific wavelength by optimally designing the sectional shape, but is difficult to be cancelled over a wide wavelength band. Moreover, in the case of the matrix optical switch, an optical multiplexer/demultiplexer or a tapered optical waveguide input part has a sectional shape different from that of an input/output optical waveguide. Since these polarization dependence and wavelength dependence are different from those of the input/output optical waveguide, it is not easy to find shape parameters for applying optimal polarization dependence and wavelength dependence. Moreover, even when the optimal shape parameters have been found, mass productivity and stable manufacturing yield are not always obtained.

The present invention has been made in view of the aforementioned problems, and an object of the present invention is to provide a practical rib type optical waveguide in which polarization dependence and wavelength dependence and the like are small, and an optical multiplexer/demultiplexer using the same.

Solution to Problem

In order to achieve the aforementioned object, a rib type optical waveguide according to the present invention includes a substrate, and a multi-mode optical interference region including a rib type optical waveguide formed on an upper surface of the substrate, wherein both side surfaces of the multi-mode optical interference region are respectively formed in a stepped shape.

In order to achieve the aforementioned object, an optical multiplexer/demultiplexer according to the present invention includes M input optical waveguides and N output optical waveguides including a single mode rib type optical waveguide, reversible tapered regions that smoothly connect the input optical waveguides and the output optical waveguides to multi-mode optical interference regions and include M×N rib type optical waveguides, and the aforementioned rib type optical waveguide, wherein the input optical waveguides, the output optical waveguides, the multi-mode optical interference regions, and the reversible tapered regions are formed on a substrate.

Advantageous Effects of Invention

According to the aspects of the aforementioned present invention, it is possible to provide a practical rib type optical waveguide in which polarization dependence and wavelength dependence and the like are small, and an optical multiplexer/demultiplexer using the same.

BRIEF DESCRIPTION OF DRAWINGS

FIG. 7 is a top view of a rib type optical waveguide 10.

DESCRIPTION OF EMBODIMENTS

<First Example Embodiment>

Figure 1A:
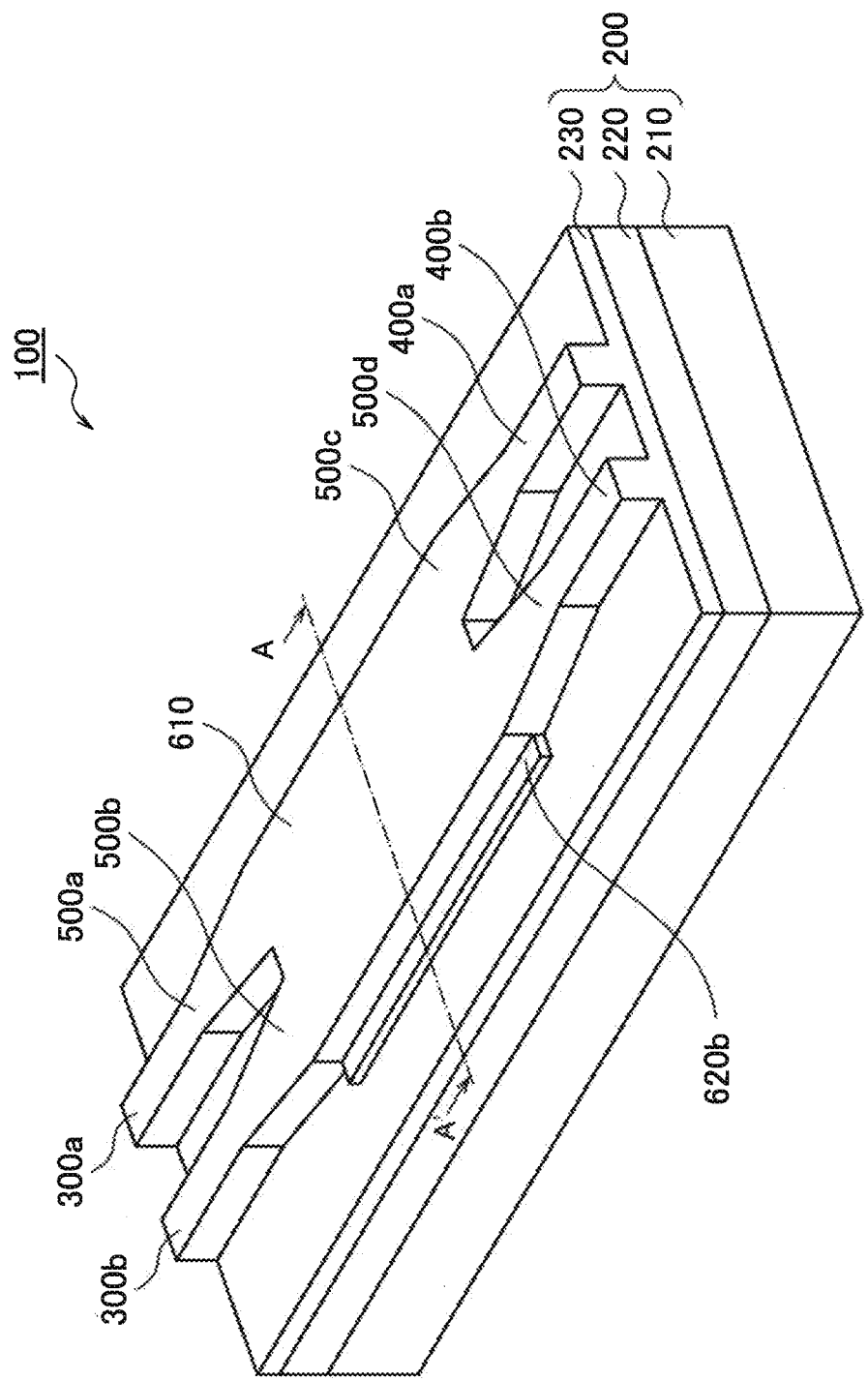
FIG. 1A is a perspective view of a 2×2 MMI optical multiplexer/demultiplexer 100 according to a first example embodiment.
Figure 1B:
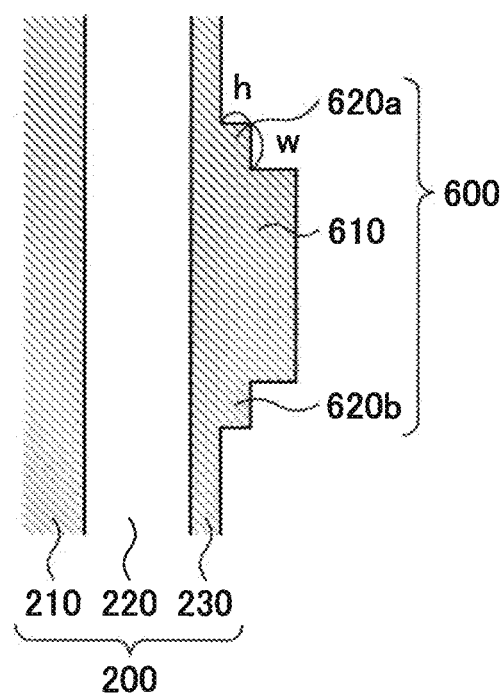
FIG. 1B is a sectional view of a 2×2 MMI optical multiplexer/demultiplexer 100 according to a first example embodiment which is taken along line A-A'.

A first example embodiment according to the present invention will be described. The present example embodiment employs a 2×2 MMI optical multiplexer/demultiplexer based on a semiconductor rib-type optical waveguide. A perspective view of the 2×2 MMI optical multiplexer/demultiplexer according to present example embodiment is illustrated in FIG. 1A and its sectional view taken along line A-A' of FIG. 1A is illustrated in FIG. 1B. In FIG. 1A and FIG. 1B, a 2×2 MMI optical multiplexer/demultiplexer 100 includes a SOI substrate (SOI: Semiconductor-on-Insulator) 200, input optical waveguides 300a and 300b, output optical waveguides 400a and 400b, tapered optical waveguides 500a, 500b, 500c, and 500d, and a rib type MMI region 600. The input optical waveguides 300a and 300b, the output optical waveguides 400a and 400b, and the tapered optical waveguides 500a, 500b, 500c, and 500d are simply written as the input optical waveguide 300, the output optical waveguide 400, and the tapered optical waveguide 500 when it is not necessary to particularly distinguish them from another.

The SOI substrate 200 is a semiconductor slab region and is formed by arranging an insulating film 220 on an upper surface of a substrate 210 and arranging a SOI layer 230 on the surface of the insulating film 220. Then, optical waveguide patterns are exposed to the SOI layer 230 with high precision and a dry etching process is performed, so that the input optical waveguide 300, the output optical waveguide 400, the tapered optical waveguide 500, and the rib type MMI region 600 are formed.

The input optical waveguides 300a and 300b are straight semiconductor rib regions, are formed in regions of one end side of the SOI layer 230 of the SOI substrate 200, and form single mode optical waveguides of a pair of input sides. Optical signals inputted to the input optical waveguides 300a and 300b are inputted to the rib type MMI region 600 via the continuous tapered optical waveguides 500a and 500b.

The output optical waveguides 400a and 400b are straight semiconductor rib regions, are formed in regions of the other end side of the SOI layer 230 of the SOI substrate 200, and form single mode optical waveguides of a pair of output sides. The output optical waveguides 400a and 400b output optical signals, which have been inputted from the rib type MMI region 600 via the continuous tapered optical waveguides 500c and 500d, to connected optical fibers and the like. In the present example embodiment, the input optical waveguides 300a and 300b and the output optical waveguides 400a and 400b have the same sectional shapes.

The tapered optical waveguide 500 smoothly connects the input optical waveguide 300 or the output optical waveguide 400 to the rib type MMI region 600. In the present example embodiment, all the four tapered optical waveguides 500a, 500b, 500c, and 500d are formed in a shape with the same length. In FIG. 1A, the tapered optical waveguide 500a smoothly connects the input optical waveguide 300a to a MMI part 610 of the rib type MMI region 600, and the tapered optical waveguide 500b smoothly connects the input optical waveguide 300b to the MMI part 610. Furthermore, the tapered optical waveguide 500c smoothly connects the output optical waveguide 400a to the MMI part 610 of the rib type MMI region 600, and the tapered optical waveguide 500d smoothly connects the output optical waveguide 400b to the MMI part 610.

The rib type MMI region 600 includes a semiconductor and allows an optical signal inputted from the input optical waveguide 300a via the tapered optical waveguides 500a to interfere with an optical signal inputted from the input optical waveguide 300b via the tapered optical waveguides 500b. Then, the rib type MMI region 600 outputs the interfered optical signal to the output optical waveguides 400a and 400b via the tapered optical waveguides 500c and 500d. In the rib type MMI region 600 according to the present example embodiment, thin stepped parts with a finite width are formed at both sidewalls extending in a direction (hereinafter, written as a longitudinal direction) toward the output optical waveguide 400 from the input optical waveguide 300. Hereinafter, the stepped parts are written as narrow width stepped parts 620a and 620b, and a rib type interference part interposed between the stepped parts 620a and 620b is written as the MMI part 610. Widths w of the stepped parts 620a and 620b are formed to be equal to or less than a propagation wavelength and heights h thereof are formed to be equal to or less than a half of the propagation wavelength. The widths w and the heights h of the narrow width stepped parts 620a and 620b are as indicated in FIG. 1B.

Figure 2A:
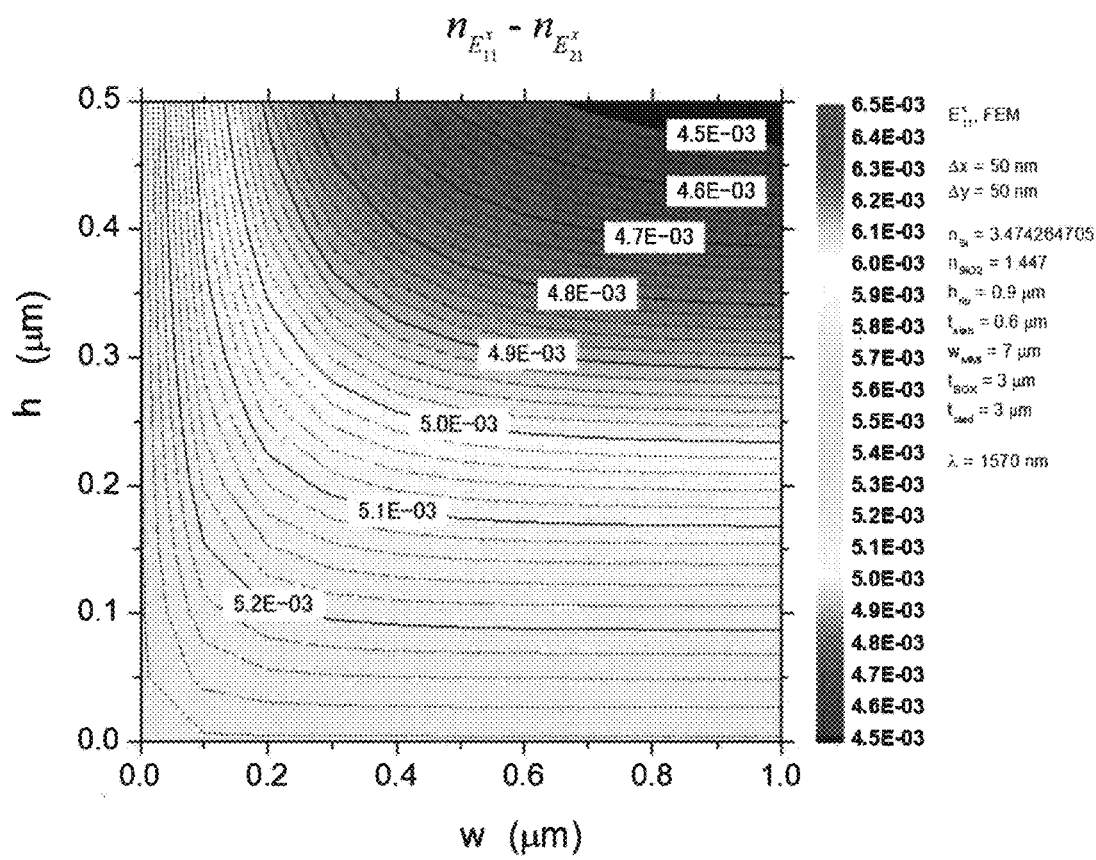
FIG. 2A is a diagram illustrating a change in an effective refractive index difference in an $E^x$ mode when sectional shapes of narrow width stepped parts 620a and 620b are changed in a 2×2 MMI optical multiplexer/demultiplexer 100 according to a first example embodiment.
Figure 2B:
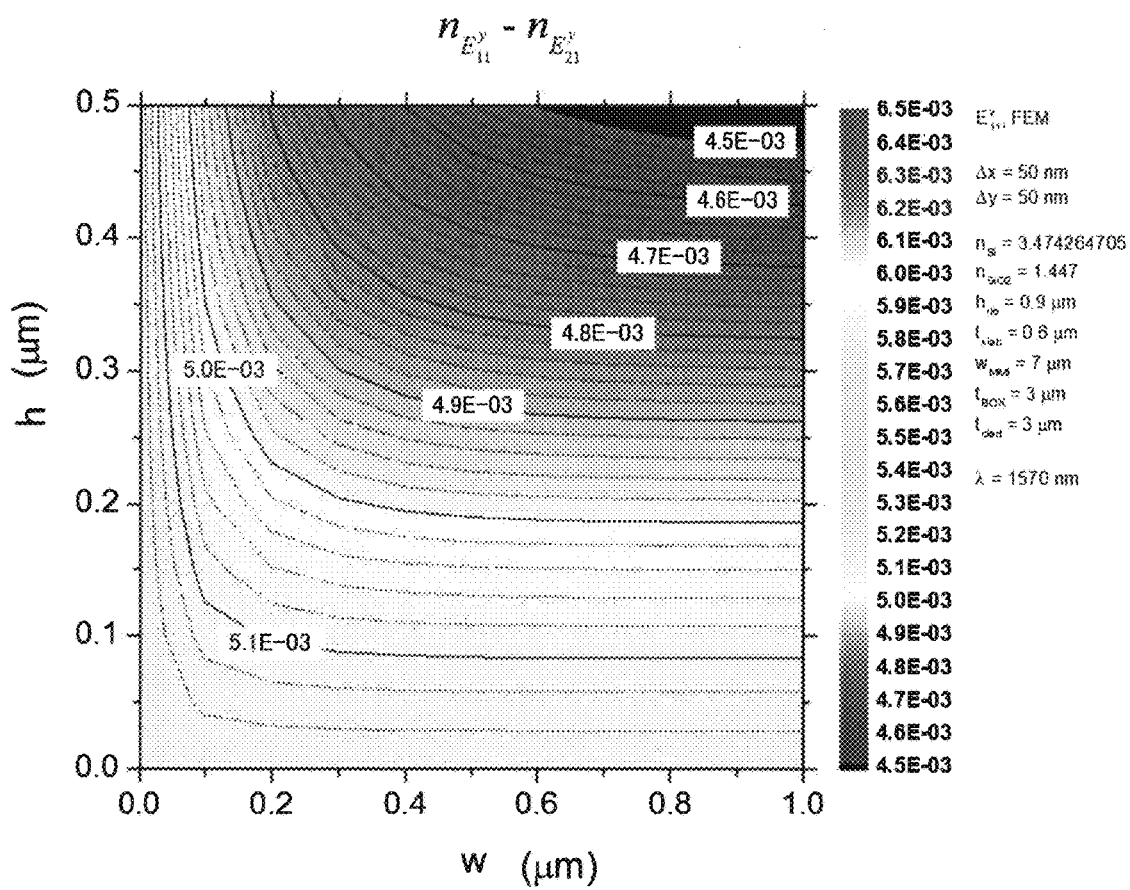
FIG. 2B is a diagram illustrating a change in an effective refractive index difference in an $E^y$ mode when sectional shapes of narrow width stepped parts 620a and 620b are changed in a 2×2 MMI optical multiplexer/demultiplexer 100 according to a first example embodiment.

FIG. 2A and FIG. 2B illustrate a difference $n_{11}-n_{12}$ (hereinafter, an effective refractive index difference) of a unique value (an effective refractive index $n_{11}$) of a basic mode and a unique value (an effective refractive index $n_{12}$) of a first high order mode of the rib type MMI region 600 when the sectional shapes of the narrow width stepped parts 620a and 620b are changed in the 2×2 MMI optical multiplexer/demultiplexer 100 configured as above. The effective refractive index difference is inversely proportional to an interference cycle (a beat length) of the basic mode and the first high order mode in the rib type MMI region 600, and is an important parameter for deciding an optimal length of the rib type MMI region 600. In FIG. 2A and FIG. 2B, a subscript of the effective refractive index difference n is written using a sign E of an electric field, but has the same meaning as that of the notation in the present specification.

FIG. 2A illustrates an effective refractive index difference $(n^x_{11}-n^x_{12})$ when a main electric field is horizontal to a substrate (an $E^x$ mode), and FIG. 2B illustrates an effective refractive index difference $(n^y_{11}-n^y_{12})$ when the main electric field is vertical to the substrate (an $E^y$ mode). In FIG. 2A and FIG. 2B, it is assumed that a horizontal axis denotes widths w of the narrow width stepped parts 620a and 620b, a vertical axis denotes heights h of the narrow width stepped parts 620a and 620b, and sections of the narrow width stepped parts 620a and 620b all have the same shape of a rectangular. For the purpose of calculation, silicon (a refractive index 3.48) is used as a material of a core layer, $SiO_2$ (a refractive index 1.447) is used as a material of a clad layer, and a signal light wavelength is assumed to 1,550 nm. Furthermore, it is assumed that a width of the MMI part 610 is 7 µm, a rib height is 0.9 µm, and a slab thickness is 0.6 µm.

In FIG. 2A and FIG. 2B, an absolute value of the effective refractive index difference is about an amount of $5\times10^{-3}$ in the $E^x$ mode and the $E^y$ mode and corresponds to more than 200 µm when it is converted to an MMI optimal length for signal light with a wavelength of 1,550 nm.

In a general semiconductor rib type optical waveguide-based MMI optical multiplexer/demultiplexer, the narrow width stepped parts 620a and 620b are not arranged at both sides of the MMI part 610. This state corresponds to the lower left origins (the width w and the height h are all zero) of FIG. 2A and FIG. 2B. When the effective refractive index difference is constant (that is, a beat length is constant), the widths w and the heights h of the narrow width stepped parts 620a and 620b are inversely proportional to each other in the range plotted in FIG. 2A and FIG. 2B. This tendency is common to both the $E^x$ mode and the $E^y$ mode, but the absolute value itself of the effective refractive index difference slightly deviates between both modes.

Figure 3:
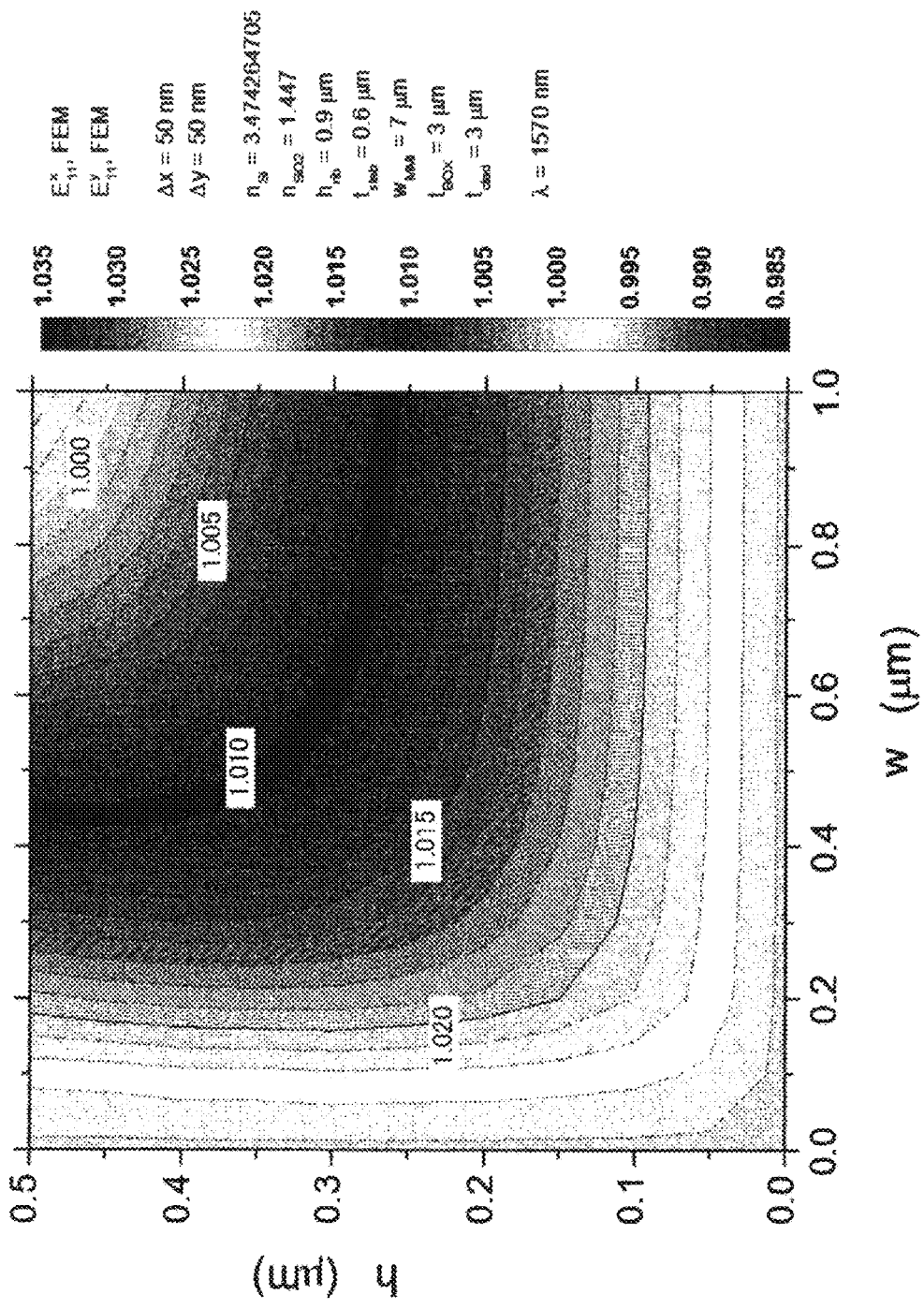
FIG. 3 is a diagram plotting the ratio of effective refractive index differences of an $E^x$ mode and an $E^y$ mode in a 2×2 MMI optical multiplexer/demultiplexer 100 according to a first example embodiment.

In order to instinctively indicate deviation in polarization of the absolute values of the effective refractive index difference, in other words, deviation in optimal lengths of both polarization in the rib type MMI region 600, FIG. 3 illustrates a ratio $(n^x_{11}-n^x_{12})/(n^y_{11}-n^y_{12})$ of the effective refractive index differences of the $E^x$ mode and the $E^y$ mode.

In FIG. 3, the ratio of polarization of the effective refractive index differences monotonically decreases as the widths w and the heights h of the narrow width stepped parts 620a and 620b increase. When the ratio is 1, the optimal lengths of each polarization in the rib type MMI region 600 coincide with each other, that is, when it is assumed that there is no influence of the input/output optical waveguide, it is probable that it is possible to perform a polarization independent operation of the 2×2 MMI optical multiplexer/demultiplexer.

While the ratio of the effective refractive index differences is about 1.025 in the vicinity of the lower left origin of FIG. 3, the ratio is 1 when the height h is about 0.5 µm and the width w is about 1 µm. This means that it is possible to adjust the polarization dependence of the 2×2 MMI optical multiplexer/demultiplexer 100 within a certain range by adjusting the widths w and the heights h of the narrow width stepped parts 620a and 620b provided at both sides of the MMI part 610. That is, when beat lengths in the MMI part 610 coincide with each other between both polarization, if only the rib type MMI region 600 is considered, it is possible to design the narrow width stepped parts 620a and 620b capable of performing a polarization independent operation. In addition, since the narrow width stepped parts 620a and 620b can be formed by adding one mask, a one-time lithography process, and a one-time etching process of the core layer respectively, an influence to mass productivity and manufacturing yield is also limited.

In addition, the aforementioned discussion corresponds to the case of focusing on only the effective refractive index difference (the beat length) in the rib type MMI region 600 in which the narrow width stepped parts 620a and 620b have been arranged. This corresponds to the case in which both the basic mode and the first high order mode in the rib type MMI region 600 can be excited with an ideal planar wave. However, it is general that a reversible tapered optical waveguide region is arranged between the rib type MMI region 600, and the input optical waveguide 300 and the output optical waveguide 400. By so doing, the two-dimensional electromagnetic field distribution of two optical waveguides connected to both ends of input and output continuously changes. As signal light propagates the reversible tapered optical waveguide region, a beam shape (mainly, a beam width) continuously changes (the beam with is mainly extended or reduced), and simultaneously an equiphase surface (a wave front) is distorted from a plane (a curvature changes). In addition, when the reversible tapered optical waveguide region is formed with the tapered optical waveguides 500a, 500b, 500c, and 500d including a semiconductor formed by processing the SOI layer 230 in a strip shape, the reversible tapered optical waveguide region itself has polarization dependence.

The curvature of the equiphase surface (the wave front) is considered as an amount proportional to a propagation distance, and when the lengths of the tapered optical waveguides 500a, 500b, 500c, and 500d are sufficiently long compared to a wavelength, the signal light shows a behavior approximate to a plane wave. As the lengths of the tapered optical waveguides 500a, 500b, 500c, and 500d are increased (as the tapered width is gently changed), while the loss (mode conversion loss) due to a mode shape change is suppressed, the loss due to optical absorption or scattering is increased. When the lengths of the tapered optical waveguides 500a, 500b, 500c, and 500d may not be sufficiently increased compared to a wavelength, the equiphase surface (the wave front) of an electromagnetic field distribution of signal light to be propagated is kept to be curved. In this case, in the rib type MMI region 600, signal light is not excited with a plane wave, but is excited in the state in which the equiphase surface (the wave front) has been distorted. This causes finite loss and polarization dependence is shown in the loss itself.

From the above, the extent of contribution of polarization dependence shown by the tapered optical waveguides 500a, 500b, 500c, and 500d is added to the discussion related to the beat length, resulting in a phenomenon actually occurring in the 2×2 MMI optical multiplexer/demultiplexer 100. The case in which, the inter-polarization ratio $(n^x_{11}-n^x_{12})/(n^y_{11}-n^y_{12})$ of the absolute values of the effective refractive index differences in the rib type MMI region 600 is about 1.02, is equivalent to the case of a sectional shape in which the effective refractive index difference of the $E^x$ mode is larger than the effective refractive index difference of the $E^y$ mode by about 2%. In this case, the fact that the 2×2 MMI optical multiplexer/demultiplexer 100 including the tapered optical waveguides 500a, 500b, 500c, and 500d and the rib type MMI region 600 performs a polarization independent operation is separately confirmed through electromagnetic field analysis.

In addition, as illustrated in FIG. 3, in the effective refractive index difference of the rib type MMI region 600, the heights h and the widths w of the narrow width stepped parts 620a and 620b are substantially inversely proportional to each other. Accordingly, when the areas of the narrow width stepped parts 620a and 620b are equal to each other, it is considered that optical multiplexing and demultiplexing characteristics also show almost the same tendency. However, as the widths w of the narrow width stepped parts 620a and 620b are widened, radiation to a slab region extending outward is promoted, resulting in an increase in insertion loss. Accordingly, it is desired to suppress the widths w of the narrow width stepped parts 620a and 620b to be approximately equal to the signal light wavelength of the core material. On the other hand, it is desired to suppress the heights h of the narrow width stepped parts 620a and 620b to be equal to or less than a half of the signal light wavelength of the core material.

Furthermore, if the polarization dependence is decided only by the sectional areas of the narrow width stepped parts 620a and 620b, the sectional shapes of the narrow width stepped parts 620a and 620b can also be formed in a right angled triangle for example. Actually, depending on manufacturing conditions in forming the rib type MMI region 600, particularly, selection methods of etching conditions, there is a case in which a rib sidewall is inclined from a surface vertical to the substrate. However, when an inclination is allowed to occur in the rib sidewall of the rib type MMI region 600, the rib sidewalls of the input optical waveguide 300, the output optical waveguide 400, and the tapered optical waveguide 500 are also inclined. In this case, the electromagnetic field distributions of the basic modes of the input optical waveguide 300 and the output optical waveguide 400 deviate from an assumed shape, so that design of polarization independence becomes difficult. Accordingly, it is practical that the sectional shapes of the narrow width stepped parts 620a and 620b are rectangular.

EXAMPLE

The operation of the 2×2 MMI optical multiplexer/demultiplexer 100 described in the first example embodiment will be described. The insulating film 220 including a $SiO_2$ film with a thickness of 3 μm and the SOI layer 230 serving as a semiconductor layer with a thickness of 1.5 μm are arranged on the substrate 210, so that the SOI substrate 200 is formed. Moreover, optical waveguide patterns are high precisely formed in the SOI layer 230 on the SOI substrate 200 by using a photolithography technology, so that the 2×2 MMI optical multiplexer/demultiplexer 100 described in the first example embodiment is formed.

The input optical waveguide 300 and the output optical waveguide 400 are rib type optical waveguides in which Si is used as a core and $SiO_2$ is used as a clad, and have a rib width of 1.4 μm, a rib height of 0.9 μm, and a slab thickness of 0.6 μm. Furthermore, in a wavelength band of 1,530 nm to 1,610 nm, the input optical waveguide 300 and the output optical waveguide 400 satisfy single mode propagation conditions together with both polarization of the $E^x$ mode and the $E^y$ mode. The MMI part 610 of the rib type MMI region 600 is formed to have a width of 7 μm, a length of 234 μm, a rib height of 0.9 μm, and a slab thickness of 0.6 μm. Furthermore, the narrow width stepped parts 620a and 620b are all formed to have a height of 0.2 μm and a width of 0.5 μm. The aforementioned input optical waveguide 300 and the output optical waveguide 400, and the aforementioned rib type MMI region 600 are smoothly connected to each other by the tapered optical waveguide 500 (a reversible horizontal tapered region) having a length of 50 μm in which a rib height is 0.9 μm, a slab thickness is 0.6 μm, and a width is linearly changed from 1.4 μm to 3 μm.

These are highly precisely processed with precision of ±20 nm or less together with a width and a thickness by applying the most advanced CMOS process such as high precision photolithography using a reduction projection exposure device using ArF in a light source and a phase shift mask, and a low damage dry etching technology. Furthermore, in a process in the vicinity of the rib type MMI region 600, a previously stepped SiN film (not illustrated because it is removed in a manufacturing process) is provided as an etching blocking layer to be provided to the surface of the SOI substrate 200, so that the MMI part 610 and the narrow width stepped parts 620a and 620b at both sides thereof are integrally formed with each other in a one-time dry etching process.

Figure 4:
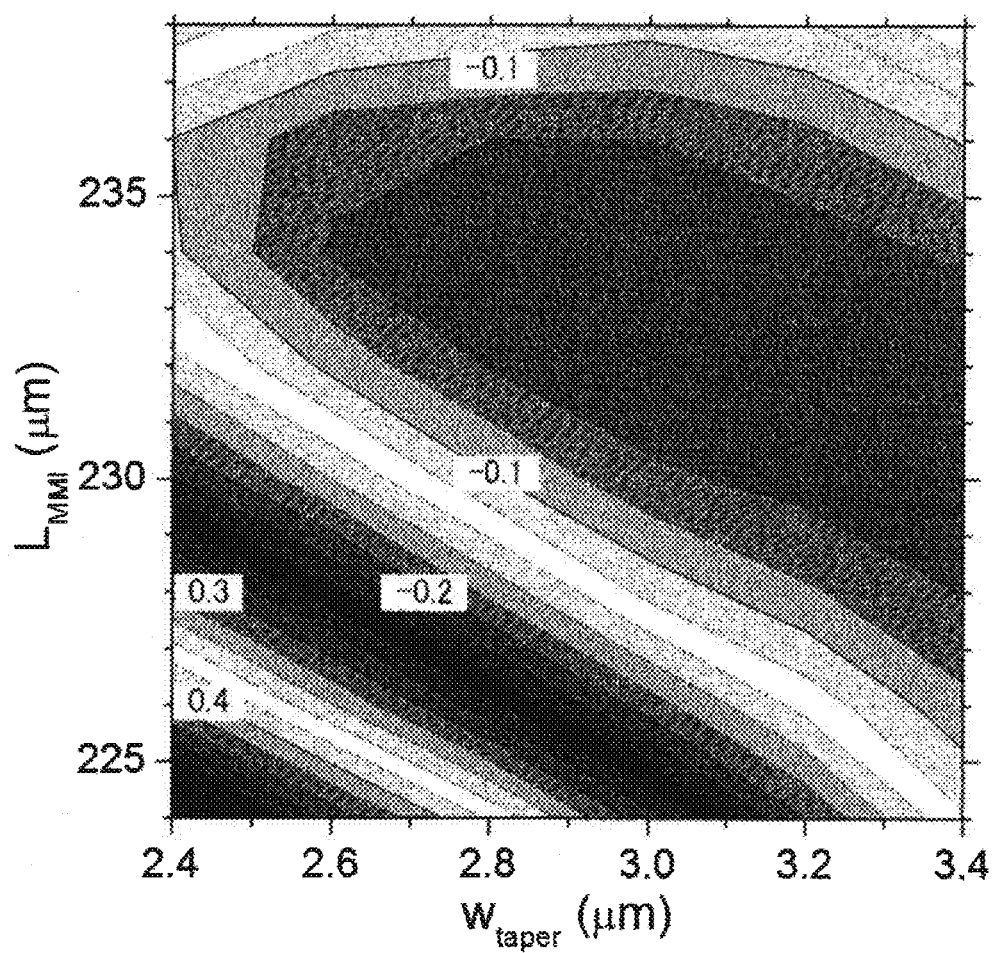
FIG. 4 is a diagram illustrating a change in transmittance for an $E^x$ mode when dimensions of a tapered optical waveguide 500 and a rib type MMI region 600 have been changed in a 2×2 MMI optical multiplexer/demultiplexer 100 according to a first example embodiment.
Figure 5:
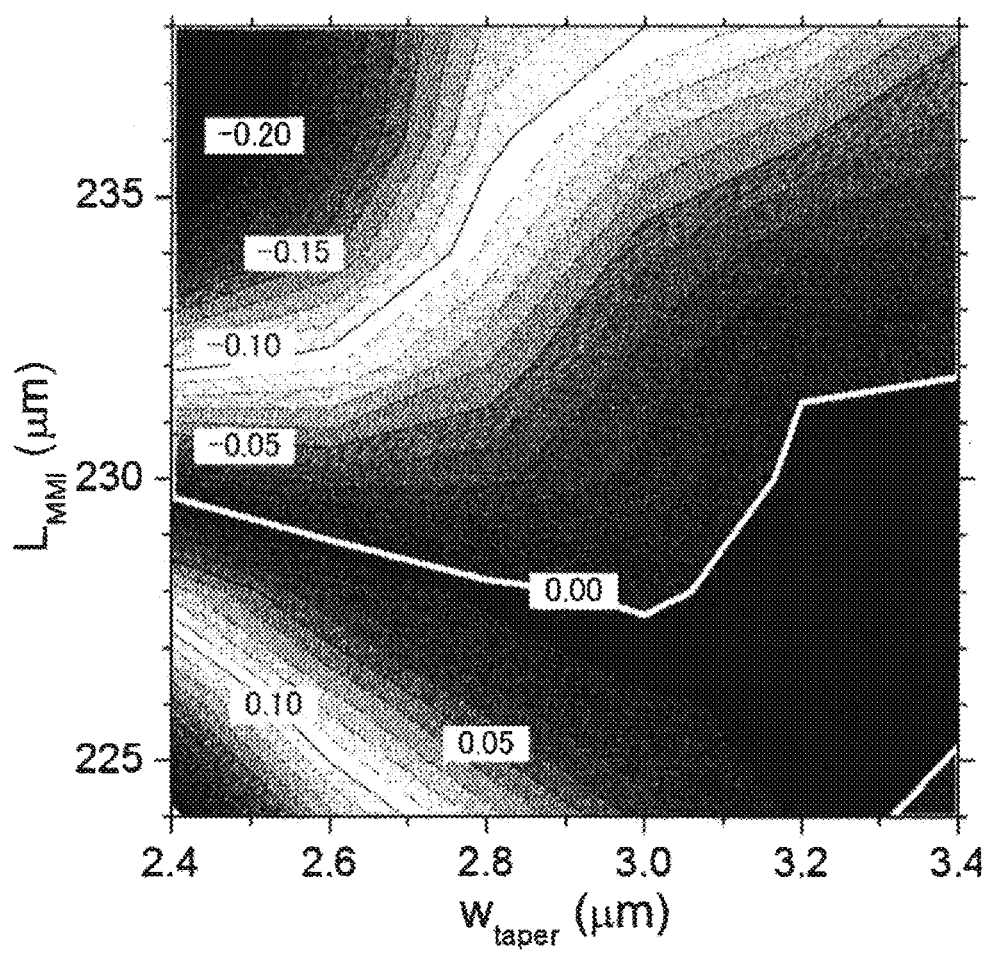
FIG. 5 is a diagram illustrating polarization dependence when dimensions of a tapered optical waveguide 500 and a rib type MMI region 600 have been changed in a 2×2 MMI optical multiplexer/demultiplexer 100 according to a first example embodiment.

The transmittance for the $E^x$ mode of the 2×2 MMI optical multiplexer/demultiplexer 100 formed as described above is illustrated in FIG. 4, and a ratio (that is, polarization dependence of transmittance) of the transmittance for the $E^x$ mode and the transmittance for the $E^y$ mode is illustrated in FIG. 5. In FIG. 4 and FIG. 5, a horizontal axis denotes the width of a tapered end portion (a wide side being in contact with the MMI part 610) of the tapered optical waveguide 500, and a vertical axis denotes the length of the rib type MMI region 600. A signal light wavelength is 1,590 nm. The transmittance is defined by Equation 1 below.

$$10 \log\{(P_{bar}+P_{cross})/P_{in}\} \text{ (unit: dB)} \quad \text{Equation 1}$$

In Equation 1 above, $P_{bar}$ denotes power outputted to a port (a bar output port) of the output optical waveguide 400 in front of signal light with power $P_{in}$ travelling straight from one side of the input optical waveguide 300, and $P_{cross}$ denotes power outputted to a port (a cross output port) of the output optical waveguide 400 in front of a diagonal line of the MMI part 610.

As apparent from FIG. 4, the width and the MMI length dependence of a tapered end portion of insertion loss for the $E^x$ mode form a track-like contour line group in which a size differs step by step. The maximum value (the minimum value of the insertion loss) of the transmittance is −0.04 dB to −0.06 dB (+0.04 dB to +0.06 dB), so that a favorable value can be obtained for a 2×2 optical multiplexer/demultiplexer for a 1.5 μm band using Si as an optical waveguide core material.

A white line of FIG. 5 indicates that the transmittance ratio of the $E^x$ mode and the $E^y$ mode is 1 (=0 dB), that is, indicates a polarization independence condition. From this, in the case of designing a practical 2×2 MMI optical multiplexer/demultiplexer with maximum transmittance (insertion loss is minimum) and polarization independence, it is sufficient if there is a condition (the width of the tapered end portion and the length of the MMI part) in which a transmittance maximum region in FIG. 4 overlaps the white line in FIG. 5 with each other. Specifically, for example, it is sufficient if the length of the MMI part 610 is 232 μm and the width of the tapered end portion of the tapered optical waveguide 500 is 3.3 μm.

Similarly to the case in which a signal light wavelength is 1,590 nm, in the case in which a signal light wavelength is from 1,570 nm to 1,610 nm, the transmittance for the $E^x$ mode, as well as a ratio of the transmittance for the $E^x$ mode and the transmittance for the $E^y$ mode is calculated (not illustrated). From the result, the length of the MMI part 610 of the 2×2 MMI optical multiplexer/demultiplexer 100 is set to 232 μm and the width of the tapered end portion is set to 3.3 μm.

The 2×2 MMI optical multiplexer/demultiplexer 100 designed as described above has practical signal light branching characteristics in the signal light wavelength from 1,570 nm to 1,610 nm in configuring a matrix optical switch even though it is a rib type optical waveguide using the Si core whose section is not a square. Specifically, in relation to the insertion loss, the $E^x$ mode is from 0.08 dB to 0.09 dB, the $E^y$ mode is from 0.07 dB to 0.08 dB, and polarization dependence loss is ±0.01 dB or less.

As described above, according to the present example embodiment, in the 2×2 MMI optical multiplexer/demultiplexer 100 including the input/output tapered waveguides, it can be understood that it is possible to achieve a structure, in which polarization dependence and wavelength dependence in multiplexing and demultiplexing characteristics are suppressed to a level causing practically no problems over a wide wavelength band, by a practical means by adding required minimum steps.

In addition, the rib type MMI region 600, in which the narrow width stepped parts 620a and 620b are arranged at both sidewalls extending in the longitudinal direction of the MMI part 610, can be arranged in a ROADM (reconfigurable optical add/drop multiplexer), a 90° hybrid, an ADM matrix switch and the like, in addition to the MMI optical multiplexer/demultiplexer.

<Second Example Embodiment>

Figure 6A:
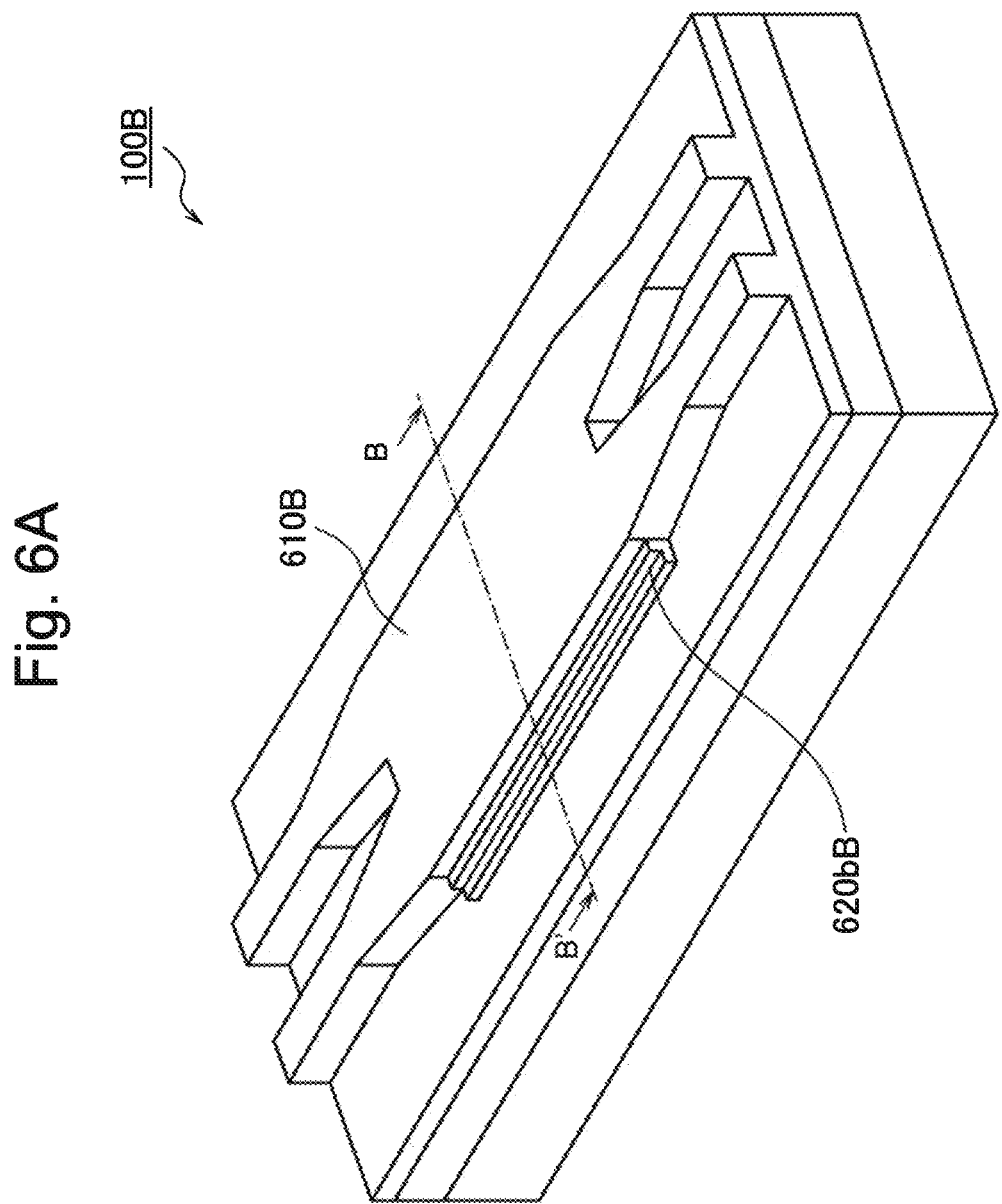
FIG. 6A is a perspective view of a 2×2 MMI optical multiplexer/demultiplexer 100B according to a second example embodiment.
Figure 6B:
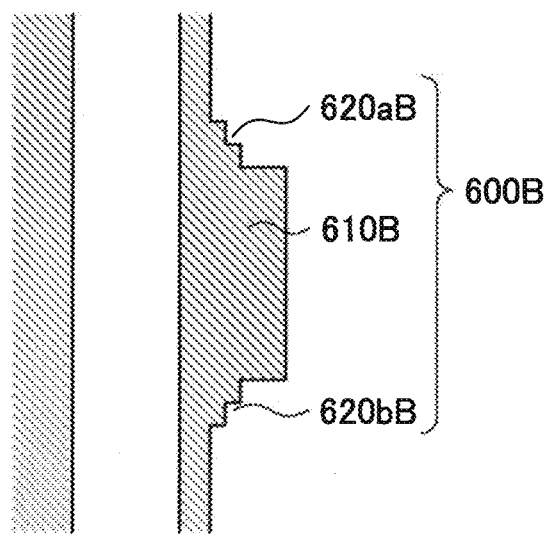
FIG. 6B is a sectional view of a 2×2 MMI optical multiplexer/demultiplexer 100B according to a second example embodiment, which is taken along line B-B'.

A second example embodiment will be described. A perspective view of a 2×2 MMI optical multiplexer/demultiplexer 100B according to the present example embodiment is illustrated in FIG. 6A, and its sectional view taken along line B-B' is illustrated in FIG. 6B. In the present example embodiment, narrow width stepped parts 620aB and 620bB are formed in a stair shape by notching corner parts in a rectangular parallelepiped shape while maintaining the areas of the rectangular parallelepiped narrow width stepped parts 620a and 620b described in the example of the first example embodiment.

Specifically, in each of the narrow width stepped parts 620aB and 620bB according to the present example embodiment, a lower part having a width of 0.4 μm and a height of 0.2 μm and an upper part having a width of 0.2 μm and a height of 0.2 μm are integrally formed with each other. Except for this point, the narrow width stepped parts 620aB and 620bB are similar to those of the 2×2 MMI optical multiplexer/demultiplexer 100 described in the example of the first example embodiment. In addition, in a manufacturing method thereof, for the lithography process of the narrow width stepped parts 620aB and 620bB, one mask and a one-time dry etching process of an etching barrier layer are respectively added to the case of the aforementioned example.

Similarly to the 2×2 MMI optical multiplexer/demultiplexer 100 of FIG. 1 described in the example of the first example embodiment, the 2×2 MMI optical multiplexer/demultiplexer 100B of FIG. 6A and FIG. 6B also obtains practical signal light branching characteristics as a 2×2 optical multiplexer/demultiplexer used in configuring a matrix optical switch even though it is a rib type optical waveguide in which its section is not a square and a Si core is used. Specifically, in relation to loss, the $E^x$ mode is from 0.08 dB to 0.09 dB, the $E^y$ mode is from 0.07 dB to 0.08 dB, and polarization dependence loss is ±0.01 dB or less over the signal light wavelength from 1,570 nm to 1,610 nm.

In the aforementioned entire example embodiment, Si is used as a core material; however, it is possible to expect similar effects even in the case of using dielectric substances other than Si as a core. Furthermore, since it is not proper to use the SOI substrate 200 in the case of compound semiconductors and the like, optical confinement in a lamination direction (a direction vertical to a substrate) is reduced. However, also in this case, since a design concept is applicable, it is sufficient if a process of applying a proper perturbation to a sectional shape is performed in order to suppress polarization dependence of an effective refractive index difference at both sides of the MMI region. Moreover, the number of each of the input/output optical waveguides is not limited to 2, and the input/output optical waveguides can be applied to a M input N output (M×N) MMI optical multiplexer/demultiplexer.

In addition, the rib type optical waveguide according to the aforementioned example embodiment can be formed by the minimum constituent members illustrated in FIG. 7. That is, a rib type optical waveguide 10 can be formed by a substrate 20 and a multi-mode optical interference region 30 formed on the upper surface of the substrate 20 and including a rib type optical waveguide. It is characteristic that both side surfaces of the multi-mode optical interference region 30 are respectively formed in stepped shapes 31 and 32.

The present invention is not limited to the aforementioned example embodiments and design changes and the like in the range of not departing from the scope of the present invention are also included in the present invention.

INDUSTRIAL APPLICABILITY

The present invention can be applied to all waveguide optical switches which are used in a M×N matrix optical switch and the like and include input/output optical waveguides and multi-mode interference regions formed on the same substrate.

This application is based upon and claims the benefit of priority from Japanese patent application No. 2014-204120, filed on Oct. 2, 2014, the disclosure of which is incorporated herein in its entirety by reference.

REFERENCE SIGNS LIST

10 Rib type optical waveguide
20 Substrate
30 Multi-mode optical interference region
100 2×2 MMI optical multiplexer/demultiplexer
200 SOI substrate
210 Substrate
220 Insulating film
230 SOI layer
300a, 300b Input optical waveguide
400a, 400b Output optical waveguide
500a, 500b, 500c, 500d Tapered optical waveguide
600 Rib type MMI region
610 MMI part
620a, 620b Narrow width stepped part

What is claimed is:

1. A rib type optical waveguide, comprising:
a substrate; and
a multi-mode optical interference region including a rib type optical waveguide formed on an upper surface of the substrate,
wherein each of both side surfaces of the multi-mode optical interference region are formed in a stepped shape and are not formed on an input optical waveguide side and the stepped shape, and
wherein a width and a height of the stepped shape are configured such that a ratio of a first difference of the multi-mode optical interference region and a second difference of the multi-mode optical interference region are approximately equal, the first difference is a difference between an effective refractive index of a fundamental mode and an effective refractive index of a first high order mode when a main electric field of the multi-mode optical interference region is horizontal to the substrate and the second difference is a difference between an effective refractive index of the fundamental mode and an effective refractive index of the first high order mode when the main electric field of the multi-mode optical interference region is perpendicular to the substrate.

2. The rib type optical waveguide according to claim 1, wherein a width of a stepped part is equal to or less than a propagation wavelength and a height of the stepped part is equal to or less than a half of the propagation wavelength.

3. The rib type optical waveguide according to claim 1, wherein, on the upper surface of the substrate, an insulating film and a semiconductor layer are arranged, and a core of the rib type optical waveguide is formed by processing the semiconductor layer in a strip shape.

4. The rib type optical waveguide according to claim 1, wherein the stepped shape is formed in a stair shape of two stages or more.

5. An optical multiplexer/demultiplexer, comprising:
M input optical waveguides and N output optical waveguides including a single mode rib type optical waveguide;
reversible tapered regions that smoothly connect the input optical waveguides and the output optical waveguides to multi-mode optical interference regions and include M×N rib type optical waveguides; and
the rib type optical waveguide according to claim 1,
wherein the input optical waveguides, the output optical waveguides, the multi-mode optical interference regions, and the reversible tapered regions are formed on a substrate.

6. The optical multiplexer/demultiplexer according to claim 5, wherein, on an upper surface of the substrate, an insulating film and a semiconductor layer are arranged, and cores of the input optical waveguides, the output optical waveguides, the multi-mode optical interference regions, and the reversible tapered regions are formed by processing the semiconductor layer in a strip shape.

7. The optical multiplexer/demultiplexer according to claim 5, wherein the input optical waveguides and the output optical waveguides include a same sectional shape.

8. The optical multiplexer/demultiplexer according to claim 5, wherein all the M×N rib type optical waveguides of the reversible tapered regions include same length and same tapered width.

9. The optical multiplexer/demultiplexer according to claim 8, wherein the length of the reversible tapered regions is longer than a propagation wavelength.

10. The optical multiplexer/demultiplexer according to claim 5, wherein two input optical waveguides, two output optical waveguides, and four reversible tapered regions are provided.

11. The rib type optical waveguide according to claim 1, wherein the stepped shape is not formed on an input optical waveguide side, and
wherein the stepped shape is not formed in the multi-mode optical interference region on an output optical waveguide side.

* * * * *